United States Patent
Miyamoto et al.

(10) Patent No.: US 6,431,554 B1
(45) Date of Patent: Aug. 13, 2002

(54) METAL GASKETS

(75) Inventors: Yasuhiro Miyamoto; Yuji Fukui; Kenichi Sekioka; Yutaka Furuta, all of Osaka-fu (JP)

(73) Assignee: Nippon Gasket Co., Ltd., Osaka-fu (JP)

( * ) Notice: Subject to any disclaimer, the term of this patent is extended or adjusted under 35 U.S.C. 154(b) by 49 days.

(21) Appl. No.: 09/606,313

(22) Filed: Jun. 29, 2000

(30) Foreign Application Priority Data

Jun. 30, 1999 (JP) .......................................... 11-185240

(51) Int. Cl.⁷ ................................................ F02F 11/00
(52) U.S. Cl. ........................................ 277/593; 277/594
(58) Field of Search ................................. 277/593, 594, 277/600

(56) References Cited

U.S. PATENT DOCUMENTS

| | | | | |
|---|---|---|---|---|
| 4,721,315 A | * | 1/1988 | Ueta | |
| 5,427,388 A | * | 6/1995 | Ueta | |
| 5,472,217 A | * | 12/1995 | Hagiwara | |
| 5,544,899 A | * | 8/1996 | Ueta | |
| 5,876,038 A | * | 3/1999 | Bohm et al. | 277/593 |
| 5,957,463 A | * | 9/1999 | Inamura | 277/593 |
| 6,019,376 A | * | 2/2000 | Miyaoh | 277/593 |
| 6,139,025 A | * | 10/2000 | Miyaoh | 277/593 |

FOREIGN PATENT DOCUMENTS

| | | |
|---|---|---|
| JP | 155375/1987 | 7/1987 |
| JP | 175579/1992 | 6/1992 |
| JP | 219572/1992 | 8/1992 |
| JP | 207672/1994 | 7/1994 |
| JP | 265022/1994 | 9/1994 |
| JP | 7-198040 | * 8/1995 |
| JP | 110827/1998 | 4/1998 |
| JP | 241769/1998 | 9/1999 |
| JP | 145969 | 5/2000 |

\* cited by examiner

*Primary Examiner*—Anthony Knight
*Assistant Examiner*—Alison K. Pickard
(74) *Attorney, Agent, or Firm*—Browdy and Neimark (57) ABSTRACT

A metal gasket is disclosed in which a shim laid on a bead plate around bore apertures in the bead plate is varied in radial width along the peripheries of the bore apertures to compensate for sealing stress circumferentially of the bore apertures. The metal gasket is composed of a bead plate with beads around its bore apertures and a shim including annular areas defining bore apertures and bridges connecting together any two adjoining annular areas. The shim around the bore apertures has a radial width at the bridges, which is substantially equal with a width across a web defined between any adjoining cylinder bores formed in mating surfaces of the cylinder block and cylinder head. Moreover, the shim at areas other than the bridges is varied continuously in its radial width in a range of from a flat area around the bore apertures to an area corresponding to the bead on the bead plate. Variations in radial width of the shim makes compensate partly for a sealing stress distribution around the first bore apertures.

4 Claims, 10 Drawing Sheets

METAL GASKETS

BACKGROUND OF THE INVENTION

1. Field of the Invention

The present invention relates to a metal gasket in which a shim is laid on a bead plate.

2. Description of the Prior Art

Conventionally, there has been well known a metal gasket having a shim or spacer to increase a thickness of an area around a bore aperture. Such metal gaskets are disclosed in, for example, Japanese Patent Laid-Open Nos. 155375/1987 and 219572/1992.

Moreover, a metal gasket in which a thick member or shim is interposed between base plates is disclosed in a variety of prior documents, for example, Japanese Patent Laid-Open Nos. 175579/1992, 219572/1992, 207672/1994, 110827/1998 and 241769/1999.

As the metal gaskets disclosed in the prior documents enumerated above are of a type in which no fold is prepared around the bore aperture, a shim of uniform thickness is arranged on the base plate or interposed between the confronting base plates around the bore apertures to help ensure the compensation for difference in sealing stress, which might otherwise occur between the areas around the bore apertures and other major area including therein water holes, oil openings and the like. In addition, any metal gasket of the type disclosed in the documents recited above employs a thick spacer disposed between the base plates or a shim of uniform thickness secured on the base plate, thereby to compensate for irregularities in the mating surfaces and/or local reduction in sealing stress, which might be caused between the confronting surfaces of the cylinder head and cylinder block owing to the repeated expansion and contraction.

Disclosed in Japanese Patent Laid-Open No. 265022/1994 is a metal gasket in which an auxiliary plate or intermediate shim disposed between the confronting base plates extends around the bore apertures and has a peripheral dimension that is varied within a range of the width across the bead according to the gasket design requirements and further the bead is formed linearly at an area between the adjoining bore apertures. In the prior metal gasket constructed as described just above, the perimetric edge of the auxiliary plate always exists in the width across the bead on the base plate and also the auxiliary plate is constant in its peripheral dimension or diametric width around the bore aperture, which is defined depending on the gasket design requirements. No auxiliary plate extends over the entire width across the associated bead. Besides, when having squeezed strongly the prior metal gasket in which the auxiliary plate extends to cover the major of the width across the bead, the single bead is deformed compressively into two rows of bead, thus resulting in increasing the contacting area with the base plates to enhance the tight sealing around the bore apertures.

Figure 20:
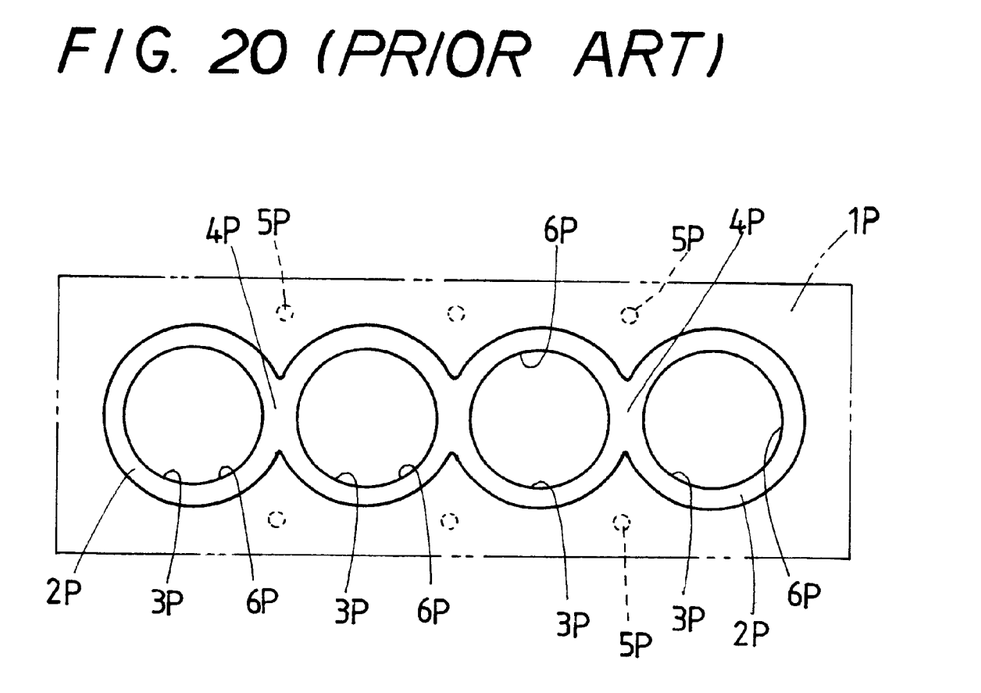
FIG. 20 is a top plan view showing a shim in a prior metal gasket.

Either as described just above or as shown in FIG. 20, any adjoining shims 2P laid on a bead plate 1P around bore apertures 3P in most prior metal gasket come in joining with each other at their merging areas 4P, so that no shim varies in width continuously around the associated bore aperture. With the shim described above, it is very hard to make uniform the sealing stress throughout around the bore aperture, especially at areas neighboring bolt holes 5P, in some tightening conditions of the cylinder head to the cylinder block. Thus, such prior metal gasket has a tendency to less flexibility or adaptability on a practical application to a variety of engines, which are diverse in tightening condition. The closed-deck type engine, as mostly great in rigidity of the cylinder block, has the tendency to somewhat higher tightening or hold-down load, compared with that in the open-deck type engine. This causes the sealing stress around the bore apertures a local rise at the areas nearby the tightening holes, thus making it tough to ensure the sealing stress that is uniform throughout around the bore aperture. In order to cope with the drawback in the sealing stress around the bore aperture, the metal gasket is required to have means for balancing minutely the sealing stress throughout around the bore aperture.

There is no prior metal gasket in which the auxiliary plate or shim varies in radial width circumferentially around the bore aperture to compensate for variations in sealing stress, with taking into consideration a correlation between the sealing stress and the radial width of the shim. In the metal gasket in which a shim is laid on a bead plate, moreover, the shim uniform in radial width throughout around the bore aperture is subjected to such sealing stress distribution that the stress, though becoming high at areas neighboring the tightening holes, lowers at other areas remote from the tightening holes. That is to say, the metal gasket squeezed between the cylinder head and the cylinder block experiences much tightening force and correspondingly much affection of explosion in the engine at the areas nearby the tightening holes in which the hold-down bolts fit to clamp the metal gasket. Thus, the sealing stress around the bore apertures also inevitably becomes much higher at the areas neighboring the tightening holes than at the residual areas. After all, there arises a major problem in which the sealing stress occurring in the metal gasket can not kept uniform or constant throughout around the bore apertures.

Latest engines require low rigidity or/and high combustion pressure, but they frequently involve a major problem to be solved, in which minute variations in the sealing stress occurring circumferentially around the bore apertures has an influence undesirable from the view point of sealing performance of the metal gasket. That problem is much liable to arise in, especially, the metal gasket that disposed between the confronting cylinder head and block of the closed-deck type engine, in which the tightening load is selected at somewhat high level.

SUMMARY OF THE INVENTION

The present invention has as its primary object to overcome the problem described just above and, especially, the provision of a metal gasket that may be preferably used in a closed-deck type engine, which is made compact or slim in construction, light in weight and also tough against high combustion pressure. More particularly, the metal gasket of the present invention is simple in construction and composed of a bead plate and a shim laid on the bead plate, the shim being changed in radial width circumferentially to partly compensate for a sealing stress distribution around a bore aperture formed in the bead plate. The radial width of the shim laid on the bead plate is made varied continuously around the bore aperture in the bead plate, thereby balancing minute variations in sealing stress to help ensure the sealing pressure distribution that is uniform circumferentially of the bore aperture.

The present invention is concerned with a metal gasket adapted to be used interposed between mating surfaces of a cylinder block and cylinder head held together with tightening bolts, which comprises a bead plate made with first bore apertures and beads extending around the first bore apertures, each to each aperture, and a shim made with second bore apertures in alignment with the first bore apertures and laid on the bead plate, the shim being composed of areas extending around the second bore apertures and bridges connecting the adjoining areas with each other; the improvement wherein the shim around the second bore apertures has a radial width at the bridges between any adjoining second bore apertures, which is substantially equal with a width across a web defined around any cylinder bore formed in mating surfaces of the cylinder block and cylinder head, and the shim at areas other than the bridges is varied continuously in its radial width in a range of from a flat area around the first bore apertures in the bead plate to an area corresponding the bead on the bead plate, whereby variations in radial width of the shim around the second bore apertures result in compensating partly for a sealing stress distribution around the first bore apertures.

In accordance with an aspect of the present invention, an improved metal gasket is disclosed, wherein the shim is defined such that its area around the second bore apertures, when relieved from tightening load, extends in radial width from peripheral edges of the second bore apertures to a radial area covering at least an range corresponding any bead nearest the first bore apertures, while under tightening load extends over inside roots of the beads even at its minimum radial width.

In accordance with another aspect of the present invention, an improved metal gasket is disclosed, wherein the shim around the second bore apertures has a radial width that is made minimum at areas neighboring tightening holes formed in the bead plate for fitting the bolts.

In the metal gasket of the present invention constructed as described just above, the sealing stress occurring at the beads extending around the bore apertures may be properly, easily compensated or regulated with only changing the radial width of the shim laid on the bead plate at the areas around the bore apertures, without requiring altering partly the thickness of the shim and/or the height of the bead raised on the bead plate. The shim provided in the present invention is successful in making the sealing stress distribution around the bore aperture regulate minutely along the periphery of the bore aperture, thereby compensating easily for the unbalanced distribution of the sealing stress about the bore aperture to keep the desired sealing stress uniform circumferentially of the bore aperture. That is to say, according to the metal gasket of the present invention, the proper regulation of the sealing stress happening in the metal gasket may be easily realized by merely varying partly the radial width of the shim along the periphery of the bore aperture.

Generally speaking about most metal gaskets, the tightening force of bolts to clamp together the cylinder block and cylinder head makes much exertion on the bead plate at the areas neighboring the tightening holes for the bolts. Accordingly, the reduction of the shim in radial width at the areas neighboring the tightening holes results in decreasing the sealing stress happening owing to the shim, thus allowing the sealing stress to render uniform throughout the metal gasket. This construction of the shim of the present invention is preferably applied to, especially, the closed-deck type engine to regulate the sealing stress in the metal gasket.

In another metal gasket in which the shim is disposed between the confronting bead plates, the shim has no irregularity on its own opposite surfaces and, therefore, makes it possible to reduce overall height or thickness of the gasket and also to keep small the variations in the clearance between the cylinder block and cylinder head, which might happen owing to the pressure inside the cylinder bore. In addition, the metal gasket of the present invention, as having the shim in place of folded portions, is simple in construction.

DETAILED DESCRIPTION OF THE PREFERRED EMBODIMENTS

The metal gasket according to the present invention will be in detail explained below with reference to the preferred embodiments of the present invention shown in accompanying drawings, where like reference numerals designate identical or corresponding parts throughout the several views.

A metal gasket according to the present invention is to be used disposed between mating surfaces, not shown, of a cylinder block and a cylinder head, which are jointed together with tightening bolts. The metal gasket is comprised of a bead plate 1 provided thereon with corrugations, or beads 7, which extend around cylinder bore apertures, or first bore apertures 3 made in the bead plate 1, and a shim 2 laid on the bead plate 1, the shim being composed of annular areas to define second bore apertures 6 in alignment with the first bore apertures 3 and bridge areas 4 connecting the adjoining annular areas with one another. The bead plate 1 is also provided therein with tightening holes 5 for hold-down bolts, oil holes 20, water holes 21, additional hole 22 doubling as a tightening hole and as a oil passage, and so on.

Figure 1:
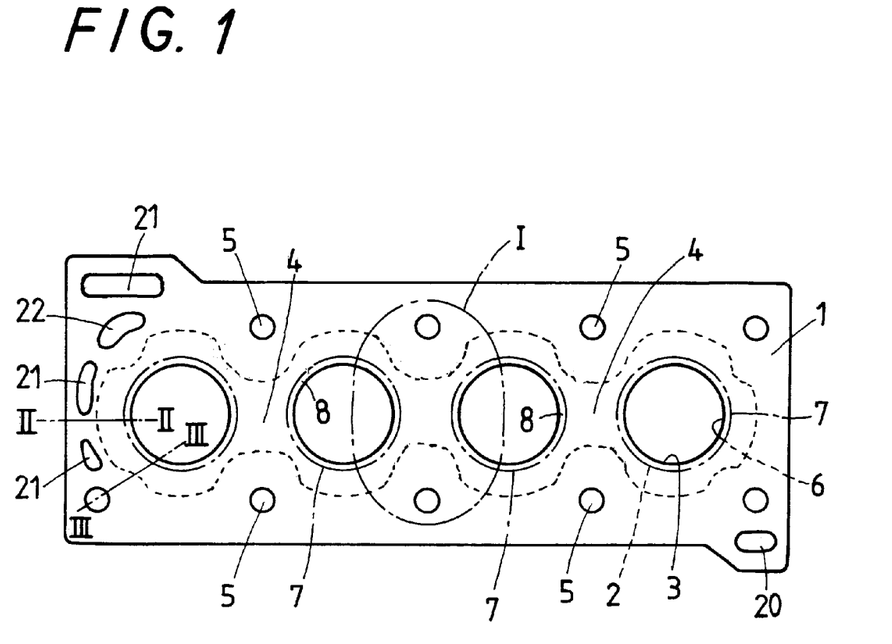
FIG. 1 is a top plan view showing a preferred embodiment of a metal gasket according to the present invention.
Figure 2:
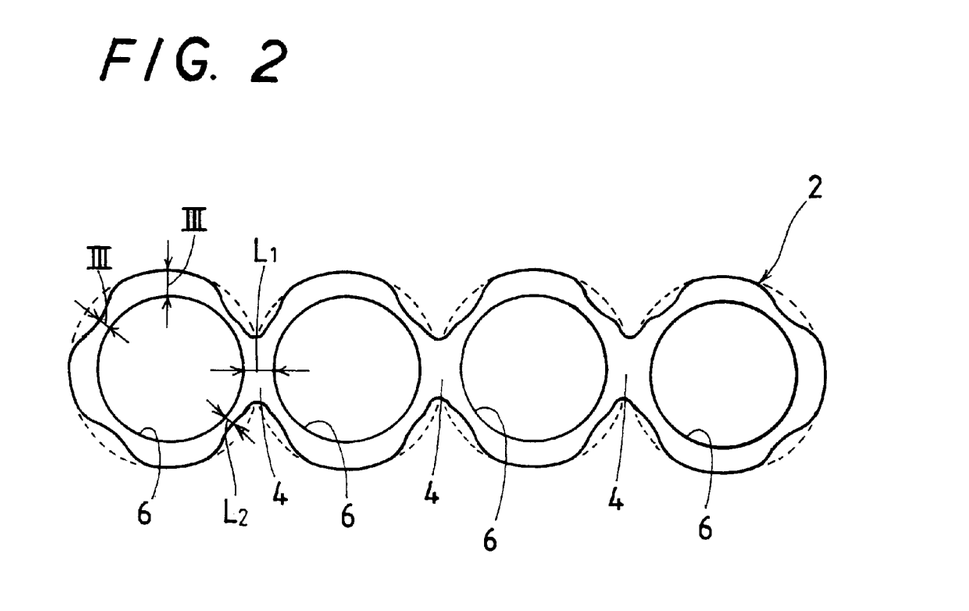
FIG. 2 is a top plan view showing a shim to be incorporated in the metal gasket shown in FIG. 1.

With the shim 2 configured as shown in FIG. 2, any bridge area 4 extending between any two adjacent second bore apertures 6 has a width $L_1$ that is substantially equal with a width of a web formed around the associated cylinder bore, not shown, on the mating surfaces of the confronting cylinder block and cylinder head. Any remainder other than the bridge area 4 is made varied continuously in radial width $L_2$ at an annular area including both of a flat area 8 and the bead 7, which extend around the associated first bore aperture 3 in the bead plate 1. The variation in radial width of the shim 2 circumferentially of the second bore aperture 6 may compensate in part for a sealing stress distribution around the first bore aperture 3. The widths $L_1$ and $L_2$ in the shim 2 are each selected such that the shim 2, when relieved from the tightening load, may reach at least inside root 9 of the bead 7 nearest the associated first bore aperture 3, with beginning at the peripheral edge of the bore aperture 6. The shim 2 are also defined such that the shim 2 under tightening condition may extend at its minimum radial width beyond the inside root 9 of the bead 7. Moreover, the shim 2 surrounding around the bore aperture 6 is made minimum in its radial width $L_2$ at areas neighboring tightening holes 5 bored for bolts in the bead plate 1.

In the metal gasket discussed here, the bead 7 on the bead plate 1 is kept substantially uniform around the bore aperture 3, and not changed locally in contour, for example, in height circumferentially of the first bore aperture 3. Nevertheless, the bead 7 on the bead plate 1 is allowed to change locally in its width in cross section if desired in order to compensate minutely for the sealing stress. The bead 7 is shown formed in an annular pattern viewed in its top plan, but is not limited to such a pattern and may be somewhat modified depending on the shapes of the first bore apertures 3, the positions of the tightening holes 5 and corresponding minute variations in sealing stress to be balanced.

The shim 2 is produced by shearing a sheet of uniform thickness to a desired shape and size in which the bridge area 4 connects together any two adjoining annular areas extending around the associated bore apertures 3. The annular areas of the shim 2 extending around the bore apertures 3 in the bead plate 1 may be shaped either homogeneous or heterogeneous with each other in configuration. Moreover, the shim 2 to be used in, for example, either 3-cylinder engine or 4-cylinder engine has not to make identical the configuration at the opposite sides of the individual cylinder. The configuration of the shim 2 formed by lines joining the peripheries at the wider radial areas around the individual bore aperture 3 of the bead plate 1 may be made in an arbitrary shape such as polygon, quadrangle, and so on, other than substantially circular shape. On the other hand, the bead plate 1 is made of a metallic sheet having elasticity, while the shim 2, or an intermediate plate 10 in FIGS. 15 to 17, may be made of any metallic material selected from mild steel, spring steel, metals having a capability to harden when subjected to heat-treatment such as quenching, heating and others, cast irons, stainless steels, aluminum alloys, and so on.

The bead plate 1 and shim 2 constructed as in the above may be combined in various embodiments of the metal gasket. For example, a metal gasket shown in FIGS. 6, 8 and 14 is composed of a sheet of the bead plate 1 and a sheet of the shim 2 laid on the bead plate 1. In contrast, FIGS. 4, 5, 7, 9 and 13 are to illustrate a metal gasket in which a sheet of the shim 2 is disposed between two sheets of the bead plates 1 confronting one another.

Figure 15:
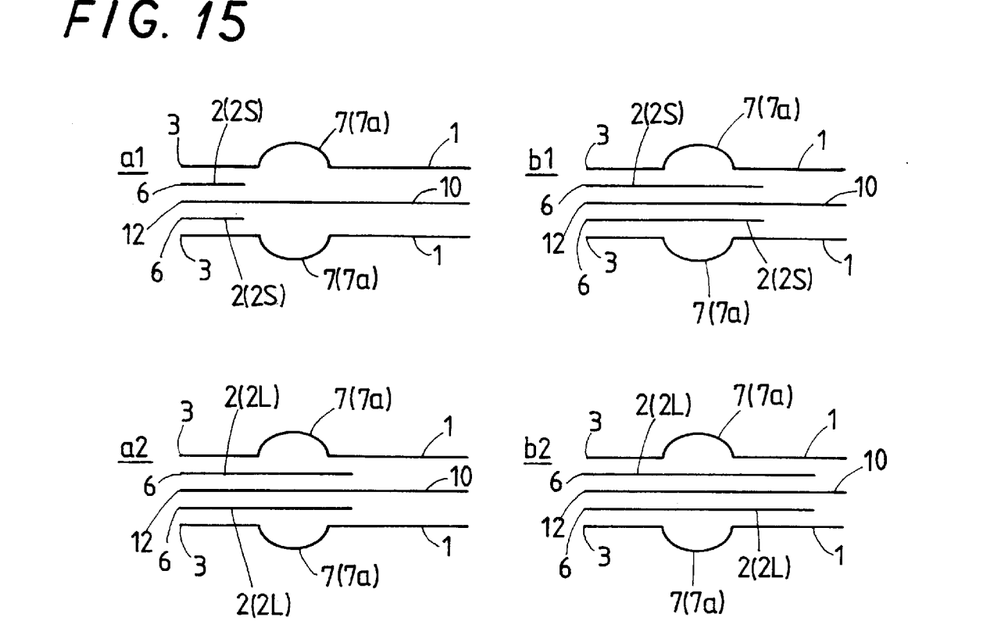
FIG. 15 is a schematic illustration showing modifications, in which the metal gasket of FIG. 1 is composed of two confronting bead plates, two sheets of shim disposed between them, and an intermediate plate interposed between the shims.

In another embodiment of the metal gasket shown in FIG. 15, two bead plates 1 are arranged with their beads 7 raised back to back in opposite direction to each other. Two shims 2 and an intermediate plate 10 are disposed in such a relation that the intermediate plate 10 is interposed between the bead plates 2 while the shims 2 are each laid between the intermediate plate 10 and any one of the bead plates 1.

Figure 16:
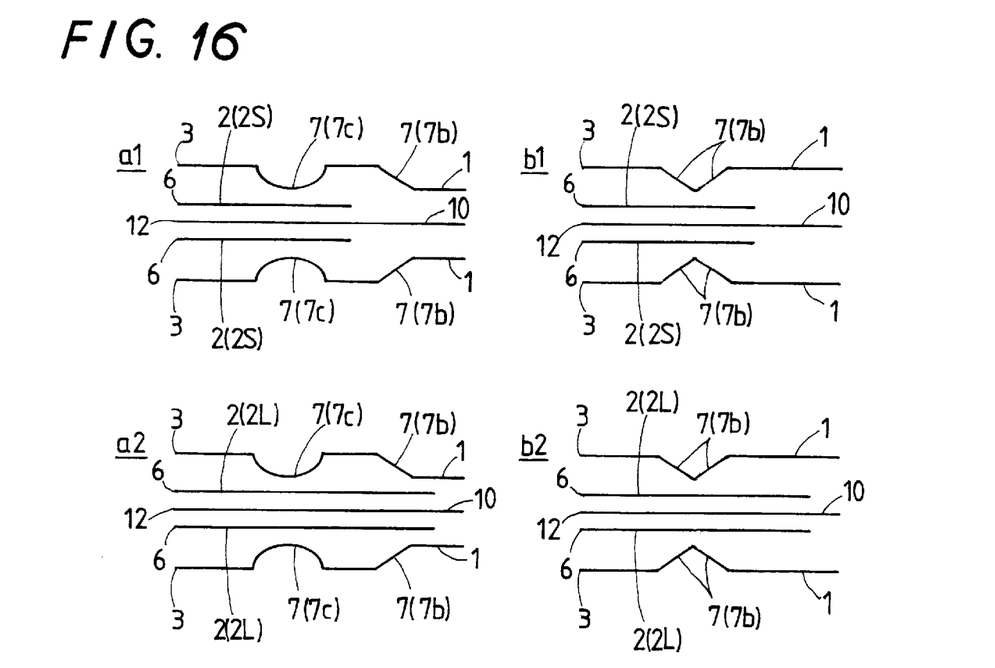
FIG. 16 is a schematic illustration showing other modifications, in which the metal gasket of FIG. 1 is composed of two confronting bead plates, two sheets of shim disposed between them, and an intermediate plate interposed between the shims.

An alternative embodiment of the metal gasket shown in FIG. 16 has two sheets of the bead plate 1, which are arranged with their beads 7 raised in face-to-face with each other. Two shims 2 and an intermediate plate 10 are disposed in such a relation that the intermediate plate 10 is interposed between the bead plates 1 while the shims 2 are each laid between the intermediate plate 10 and any one of the bead plates 1.

Figure 17:
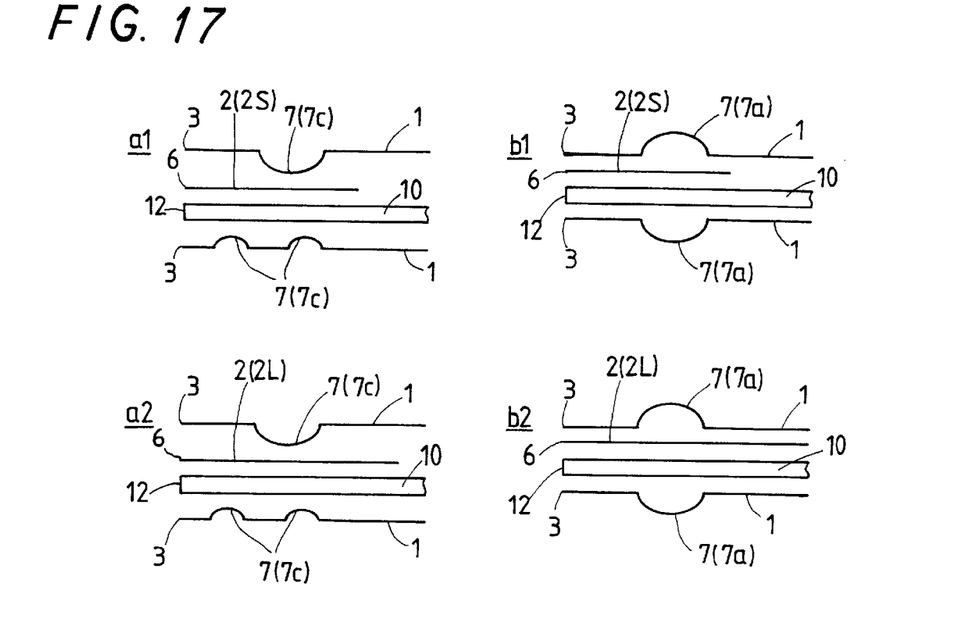
FIG. 17 is a schematic illustration showing modifications, in which the metal gasket of FIG. 1 is composed of two confronting bead plates, a shim and an intermediate plate interposed together between the bead plates.

In a further another embodiment of the metal gasket in FIG. 17, both a sheet of the shim 2 and a sheet of the intermediate plate 10 are disposed between the confronting bead plates 1.

Figure 18:
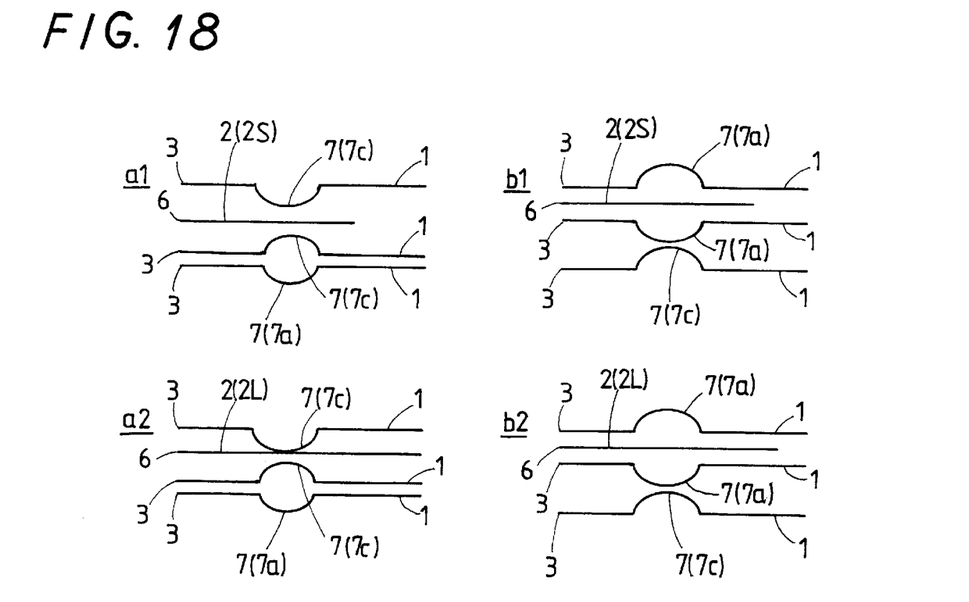
FIG. 18 is a schematic illustration showing modifications, in which the metal gasket of FIG. 1 is composed of three sheets of bead plates, and a shim disposed between any two bead plates.

As an alternative, the metal gasket shown in FIG. 18 is composed of three sheets of the bead plate 1 and a sheet of the shim 2 that is laid between any two confronting bead plates 1.

Figure 9:
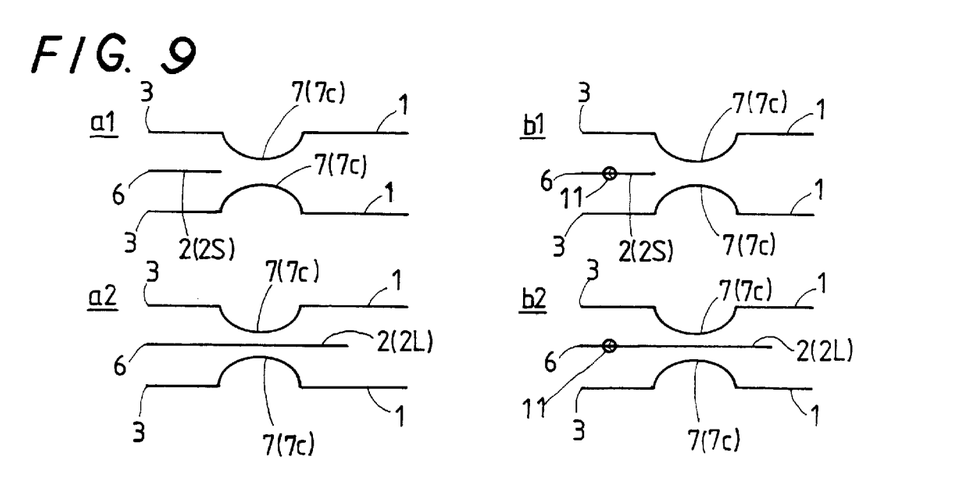
FIG. 9 is a schematic illustration showing other modifications, in which the metal gasket of FIG. 1 is composed of two confronting bead plates and a sheet of shim disposed between them.
Figure 11:
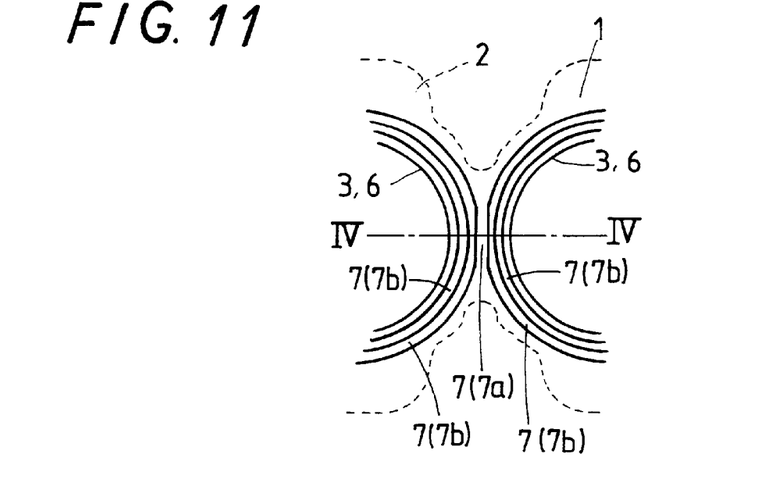
FIG. 11 is a fragmentary enlarged top plan view illustrating another embodiment of an area between the adjoining bore apertures of the metal gasket in FIG. 1.
Figure 12:
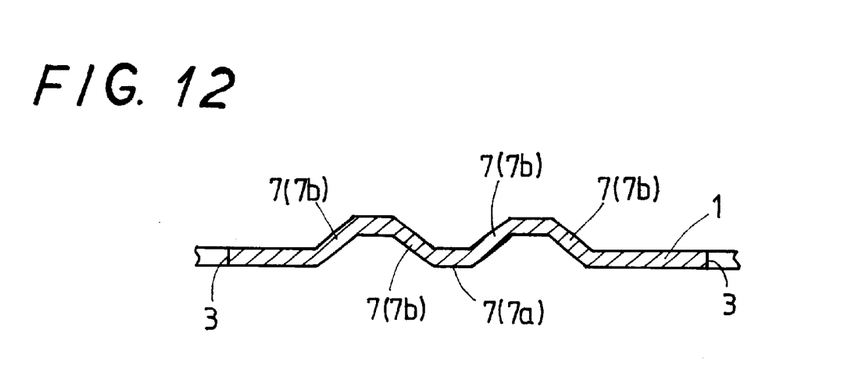
FIG. 12 is a fragmentary enlarged section of the bead plate taken along the line IV—IV of FIG. 11.

Besides the embodiments constructed as described above, the metal gasket of the present invention may incorporate therein a bead plate 1 in which the adjacent beads 7 exist independently of each other at an area between the adjoining bore apertures 3 in the bead plate 1, and not merge together into a single bead 7 as shown in FIGS. 11 and 12. It is of course appreciated that the bead plate 1 may be used in which the adjacent beads 7 join together in a bead at an area between the adjoining bore apertures 3 in the bead plate 1. In addition, the metal gasket of the present invention, as shown in FIGS. 9 and 14, may be provided at an arbitrary position with an auxiliary bead 11 that itself is disclosed in Japanese Patent Application No. 323809/1998. The auxiliary bead is made of a substance exhibiting sealing effect, for example, synthetic polymers such as fluorine-contained rubber, urethane polymer and others.

In the metal gasket of the present invention, the bridge area 4 of the shim 2 may be made somewhat less in width than the web between the adjoining second bore apertures 6 in the shim 2. Any of bead plate 1, shim 2 and intermediate plate 10 may be subjected to desirable surface-treatment. The bead plate 1, shim 2 and intermediate plate 10 may be selectively coated on their opposite surfaces with other substances, depending upon the view point of sealing performance, restrictions on manufacturing process and production costs. The intermediate plate 10 is usually made great in thickness, compared with both the bead plate 1 and the shim 2. In the metal gasket of this invention, both the shim 2 and the intermediate plate 10 should not be limited in thickness and formed adequately in accordance with engine design to which the metal gasket is applied.

In the metal gasket disclosed here, the assembly of the bead plate 1 with the shim 2 may be accomplished with caulking, eyelets, riveting, partial folding, partial welding, and so on. While the bead plate 1 and the shim 2 are preferably joined with mechanical caulking, it will be appreciated that the shim is alternatively provided with lugs for caulking as in the shim disclosed in Japanese Patent Laid-Open No. 241769/1999.

Embodiments of the metal gasket of the present invention will be explained hereinafter in detail in reference to FIGS. 1 to 19 inclusive.

Referring now to FIGS. 1 to 5, there is shown a preferred embodiment of the metal gasket according to the present invention. The metal gasket is designed for the use in a multi-cylinder engine, or 4-cylinder engine as shown in the drawings. In the construction in FIGS. 1 and 2, there is shown the bead plate 1 made with beads 7 that are spaced apart away from each other at the area between the adjoining bore apertures 3, 6. Laid on either one or two sheets of the bead plate 1 is a sheet of the shim 2 in which the annular areas extending around the bore apertures 6 is connected in series through the bridge areas 4. The shim 2, as seen especially in FIG. 2, has a pattern made minimum in radial width at the areas neighboring the tightening holes 5 bored in the bead plate 1. The pattern made less in radial width at the areas neighboring the tightening holes 5 than the remainder is well suitable for the engine design in which the cylinder bores are arranged spaced apart from each other with a relatively wide interval.

Figure 3:
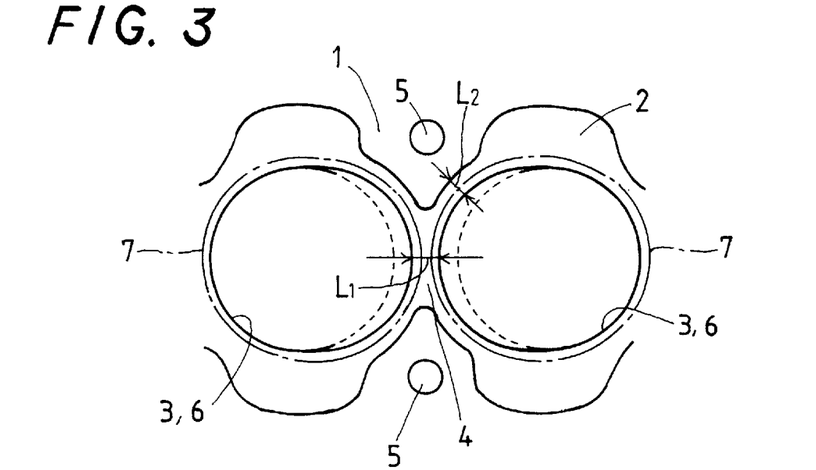
FIG. 3 is an enlarged top plan view of an area encircled with a dashed line I in FIG. 1.

The shim 2, as illustrated in detail in FIG. 3 showing an area I encircled with a dashed line, may be made less in radial width at either of an area between the adjoining bore apertures 3 and the areas neighboring the tightening holes 5, bored in the bead plate 1. The shim 2 having the pattern described above, when used in a monolayer gasket, is preferable for the application to metal gasket in which it is very hard to narrow the space between the adjoining bore apertures 3, 6 and it is inevitable to compensate for the sealing stress.

Figure 4:
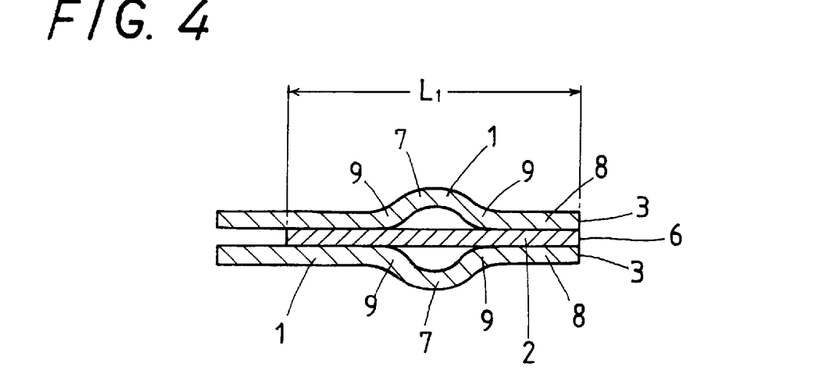
FIG. 4 is an enlarged sectional view taken along the line II—II of FIG. 1.
Figure 5:
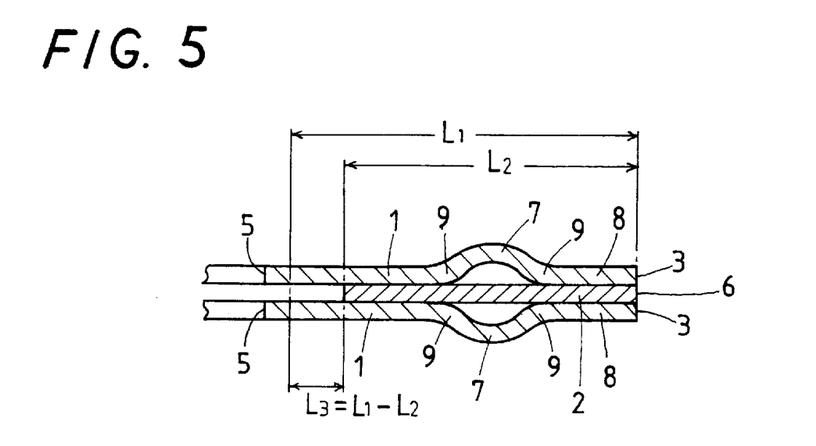
FIG. 5 is an enlarged sectional view taken along the line III—III of FIG. 1.
Figure 6:
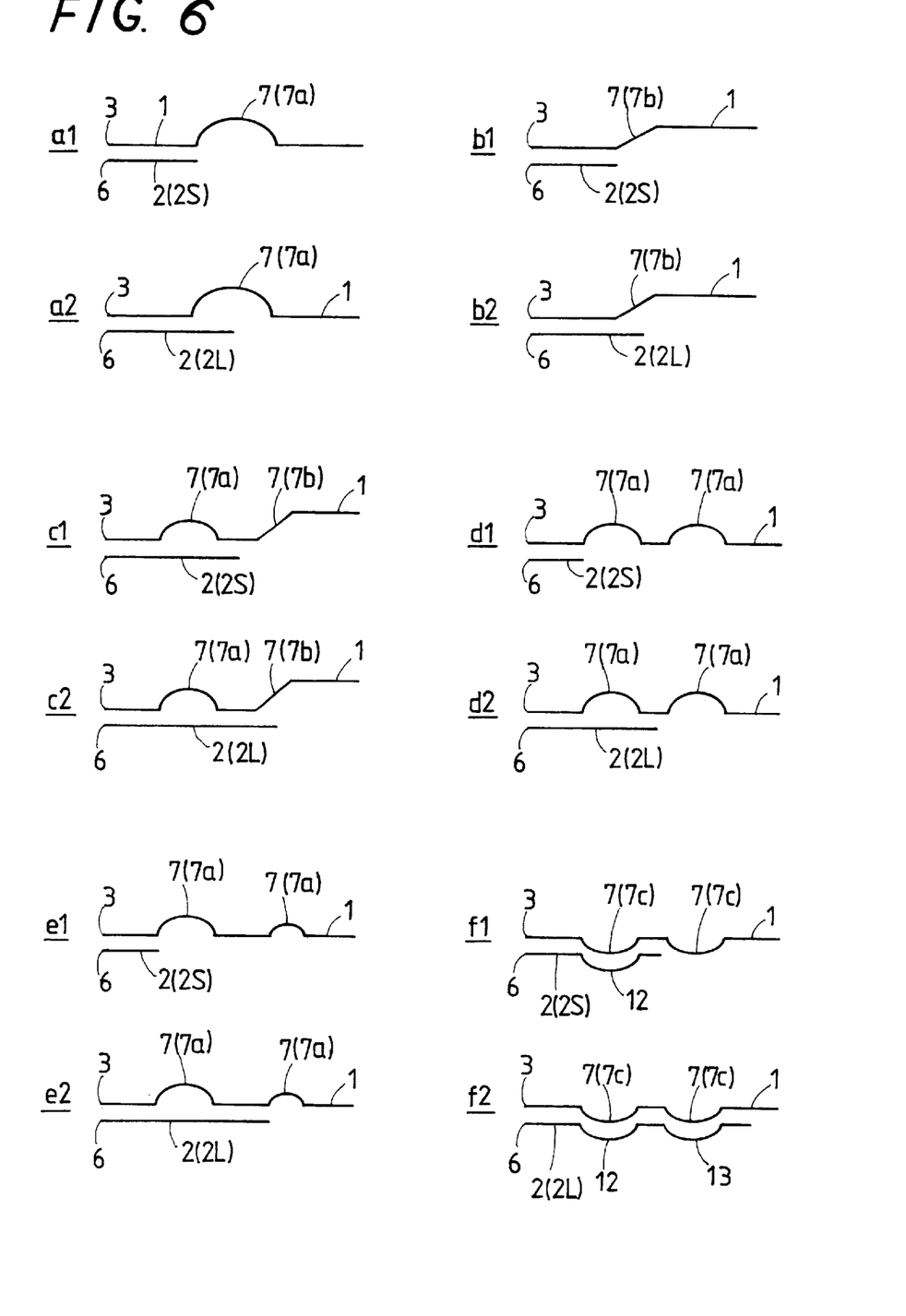
FIG. 6 is a schematic illustration showing a variety of modifications, in which the metal gasket of FIG. 1 is composed of a single bead plate and a sheet of shim.

The metal gasket, as in FIGS. 4 and 5, has a pair of the bead plates 1 that is arranged with their beads 7 raised outwardly in opposition to each other. The shim 2 is disposed between the confronting bead plates 1 and, as seen in FIG. 4 showing a section taken along the plane II—II of FIG. 1, has the radial width $L_1$ that extends from the bore aperture 6 to a preselected termination beyond both the flat area 8 and the outside root 9 of the bead 7. Moreover, the shim 2, as seen in FIG. 5 showing a section taken along the plane III—III of FIG. 1, has the reduced width $L_2$ at the areas neighboring the tightening holes 5 in the bead plate 1, which extends from the bore aperture 6 beyond the flat area 8 to a range nearby the outside root 9 of the bead 7. It will be thus understood that the variation $L_3$ in radial width of the shim 2 should be defined within $L_3=(L_1-L_2)$ around the bore aperture 6.

Referring next to FIGS. 6 to 19 there are shown a variety of preferred embodiments of the metal gasket according to the present invention. In the metal gaskets schematized in FIGS. 6 to 9 and FIGS. 13 to 18, the same alphabetic characters denote the same metal gasket, whereas unlike alphabetic characters indicate others. Upper illustrations for the individual embodiments denoted by any alphabet suffixed with numeral 1 correspond to FIG. 5 where the shim 2 is shown in the cross section taken along the plane of the narrow width $L_2$, whereas lower illustrations denoted by any alphabet suffixed with numeral 2 correspond to FIG. 4 where the shim 2 is shown taken along the plane of the normal width $L_1$.

In the embodiments of the metal gasket illustrated in FIG. 6, they are consists of a sheet of the bead plate 1 and a sheet of the shim 2. The bead plate 1 is modified in shape and number of the bead 7 at every embodiment while the shim 2 is varied mainly in width relatively of the bead at every embodiment. In FIG. 6, the same metal gaskets are given any one of the same alphabetic characters a, b, c, d, e and f and the metal gaskets suffixed with numeral 1 are shown at the area of the radial width $L_2$ where the shims 2 are made narrow or short in radial width, which correspond to FIG. 5. In contrast, the metal gaskets suffixed with numeral 2 are illustrated at the area of the radial width $L_2$ where the shims 2 are made wide or long in radial width, which correspond to FIG. 4. In the metal gaskets described above, the bead plate 1 is provided around the bore aperture with the bead 7, either a single or plural rows. Each bead may be a full bead 7a or a half bead 7b, either of which are recessed below the side facing the shim 2, or a full bead 7c raised above the side facing the shim 2. Moreover, the beads 7a, 7b and 7c may be employed either alone or in combination on the bead plate 1. In the bead plate 1 for the metal gasket described here, the bead 7 around the individual bore aperture 3 is preferably spaced apart away from the adjacent bead at the area between the adjoining bore apertures 3. In some cases, the beads 7 neighboring each other may merge into a single bead at the area between the adjoining bore apertures 3.

In the metal gaskets labeled a1, b1, c1, d1, e1 and f1 in FIG. 6, the shim 2 is shown taken along the area 2S that is narrow or short in radial width. In contrast, the shim 2 in the metal gaskets labeled a2, b2, c2, d2, e2 and f2 in FIG. 6 is taken along other area 2L wide or long in radial width. As seen from FIG. 6, the shim 2 in f1 is made with a bead 12 conforming to the bead 7 on the bead plate 1 while the shim 2 in f2 has beads 12, 13 which come in conformance with two beads 7(7c) raised towards the shim 2.

The bead plate 1 in the metal gasket labeled a1 and a2 in FIG. 6 has the full bead 7a raised above its one surface opposite to the other surface on which the shim 2 is overlaid. In the metal gasket labeled b1 and b2 in FIG. 6, the bead plate 1 is made with the half bead 7b raised above its one surface opposite to the other surface on which the shim 2 is overlaid. The other bead plate 1 in the metal gasket labeled c1 and c2 in FIG. 6 has two beads 7, both of which are raised above its one surface opposite to the other surface on which the shim 2 is overlaid. One bead 7a nearby the bore aperture 3 is formed in a full bead while another bead 7b remote from the bore aperture 3 is formed in a half bead. In the metal gasket labeled d1 and d2 in FIG. 6, there is shown another bead plate 1 in which two full beads 7a are made raised above its one surface opposite to the other surface on which the shim 2 is overlaid. The other bead plate 1 in the metal gasket labeled e1 and e2 in FIG. 6 has two full beads 7, both of which are raised above its one surface opposite to the other surface on which the shim 2 is overlaid. One bead 7a nearby the bore aperture 3 is larger in height than another bead 7b remote from the bore aperture 3. In the metal gasket labeled f1 and f2 in FIG. 6, the bead plate 1 is provided with two full beads 7c, 7c raised above its one surface facing the shim 2, which is also made with the beads 12, 13. The bead plate 1 in f2 shown in FIG. 6 has two beads 7c, 7c that are spaced apart away from each other with a flat interval of, for example, 0.5 mm, each of beads 7c, 7c having, for example, the height of 100 µm and the width of 1 mm. The shim 2 combined with the bead plate 1 has also the beads 12, 13 equal in size and shape with the beads 7c, 7c. The design exemplified above allows the metal gasket to use for the engine in which the inter-bore distance is narrow or short, that is, about 7 to 8 mm.

Figure 7:
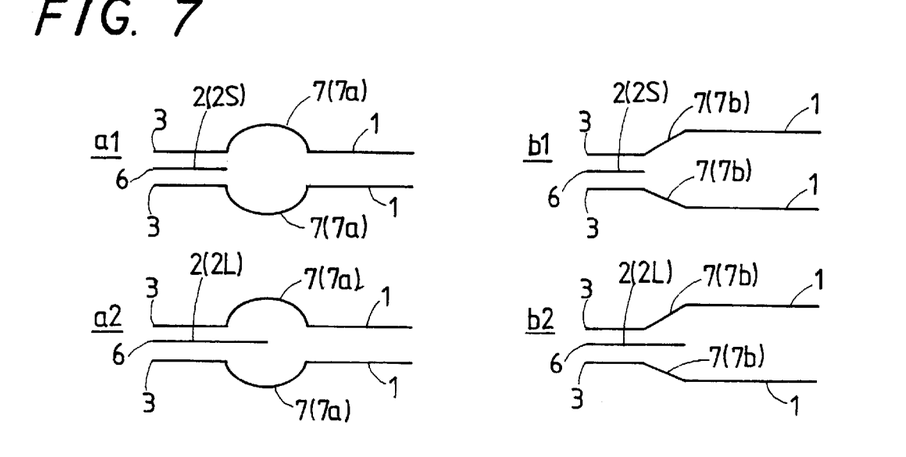
FIG. 7 is a schematic illustration showing a variety of modifications, in which the metal gasket of FIG. 1 is composed of two confronting bead plates and a sheet of shim disposed between them.
Figure 8:
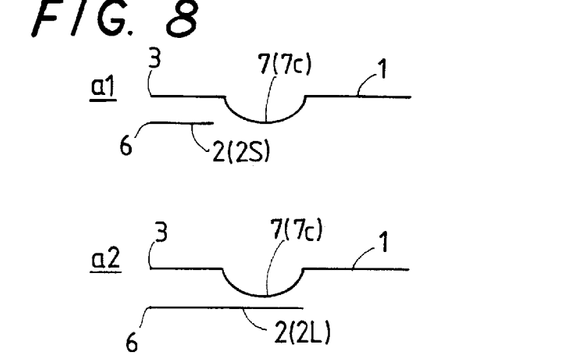
FIG. 8 is a schematic illustration showing other modifications, in which the metal gasket of FIG. 1 is composed of a single bead plate and a sheet of shim.

Referring next to FIG. 7, there are illustrated various other embodiments of the metal gasket, which is composed of two sheets of the bead plate 1 and a sheet of the shim 2 disposed between the bead plates 1. In FIG. 7, the same metal gaskets are given any one of the same alphabetic characters a and b, and the metal gaskets suffixed with numeral 1 are shown at the area where the shims 2 are made narrow or short in radial width. In contrast, the metal gaskets suffixed with numeral 2 are illustrated at the area where the shims 2 are made wide or long in radial width. The bead plates 1 in the metal gaskets in FIG. 7 are unlike in configuration at every metal gasket, while the shim 2 differs in radial width from one another. In the metal gaskets labeled a1 and b1 in FIG. 7, the shim 2 is shown taken along the area 2S that is narrow or short in radial width. In contrast, the shim 2 in the metal gaskets labeled a2 and b2 in FIG. 7 is taken along other area 2L wide or long in radial width. Each bead plate 1 in the metal gasket labeled a1 and a2 in FIG. 6 has the full bead 7a raised above its one surface opposite to the other surface on which the shim 2 is overlaid. In the metal gasket labeled b1 and b2 in FIG. 7, each bead plate 1 is made with the half bead 7b raised above its one surface opposite to the other surface on which the shim 2 is overlaid.

Referring now to FIG. 8, there is shown another embodiment of the metal gasket, which is comprised of a sheet of the bead plate 1 and a sheet of the shim 2. The metal gasket in a1 of FIG. 8 is shown at the area 2S where the shims 2 are made narrow or short in radial width. In contrast, the metal gasket a2 is illustrated at the area 2L where the shims 2 are made wide or long in radial width. Each bead plate 1 in the metal gasket labeled a1 and a2 in FIG. 8 has the full bead 7c raised above its one surface opposite to the other surface on which the shim 2 is overlaid.

Any metal gasket according to embodiments of the present invention in FIG. 9 consists of two confronting bead plates 1 and a sheet of the shim 2 disposed between the bead plates 1. The bead plates 1 in the metal gaskets in FIG. 9 are unlike in configuration at every metal gasket, while the shim 2 differs in radial width from one another. In FIG. 9, the same metal gaskets are given any one of the same alphabetic characters a and b, and the metal gaskets suffixed with numeral 1 are shown at the area 2S where the shims 2 are made narrow in radial width. In contrast, the metal gaskets suffixed with numeral 2 are illustrated at the area 2L where the shims 2 are made wide in radial width. Moreover, the shims 2 in b1 and b2 of FIG. 9 have auxiliary beads 11 nearby the bore apertures 3 to help increase the sealing stress. The auxiliary bead 11 may be formed either partially or entirely around the associated bore aperture 3. Each bead plate 1 in the metal gasket in a1, a2, b1 and b2 of FIG. 9 has the full bead 7c raised above its one surface facing the shim 2.

Figure 10:
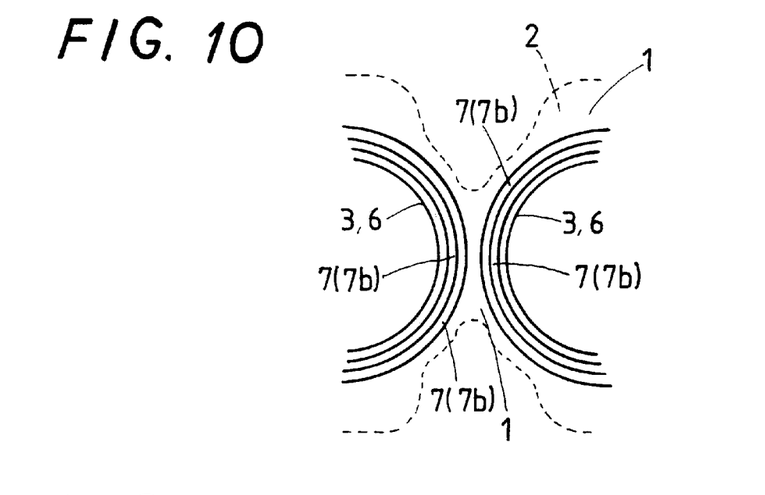
FIG. 10 is a fragmentary enlarged top plan view illustrating an embodiment of an area between the adjoining bore apertures of the metal gasket shown in FIG. 1.

Referring to FIG. 10 showing in detail the arrangement at the area between the adjoining bore apertures 3, 6, the bead plate 1 of the metal gasket in FIG. 10 is made with two rows of half beads 7b for the individual bore aperture 3, which neighbor on one another and slope in opposite directions to each other. Two sets of the half beads 7b do not join together, but extend independently of each other at the area between the adjoining bore apertures 3. As an alternative, the full beads may be used in place of the half beads.

FIGS. 11 and 12 are to explain the configuration of the metal gasket at the area between the adjoining bore apertures 3, 6. Especially, FIG. 12 is a cross section taken along the line IV—IV of FIG. 11 to illustrate two rows of half beads 7b that neighbor on one another and slope in opposite directions to each other. The half beads 7b do not join together with other half beads 7b at the area between the adjoining bore apertures 3, but extend independently of each other. At the area between the adjoining bore apertures 3 in the bead plate 1, the outside half beads 7b extend linearly and, in combination with each other, form a bead 7a resembling the full bead between them, as seen in FIG. 12. With the bead plate 1 in which the half beads 7b do not join together at any area between the adjoining bore apertures 3, the beads 7 are allowed to change an inter-bead plane interval and/or a bead width across any bead at the area between the adjoining bore apertures 3, thereby making it easy to compensate for the sealing stress distribution between any area between the adjoining bore apertures 3 and the remainder of the bead plate 1. Especially, when the half beads 7b are made linear at the area between the adjoining bore apertures 3 to reduce the interval between them as in FIG. 11, a corrugation 7a resembling the full bead is provided at the center between them, as shown in FIG. 12. This construction allows great freedom of selection of means to compensate for the sealing stress in the area between the adjoining bore apertures 3.

The full bead 7a, though not shown, may be formed in place of the half beads 7b. A single row of the half bead 7b can be also used with the same effect to provide the corrugation resembling the full bead 7a at the center of the area between the adjoining bore apertures 3. As an alternative, the beads 7b may join together in a common bead in the area between the adjoining bore apertures 3. The radial width of the shim 2 around any bore aperture 6 is in general allowed to vary arbitrarily within a range of about from 1 mm to 5 mm. In most small engines of about 0.5 to 4.0 ml displacement, since a flange width allowed for ensuring the effective sealing between the cylinder head and cylinder block is limited to from about 5 to 10 mm, the radial width of the shim 2 should be preselected to such minimal width that the area in which the shim 2 is present spans at least the entire width of a row of the bead nearest the bore hole 3. In addition, the radial width of the shim 2 is preferably not more than the effective sealing width in the flanges.

Figure 13:
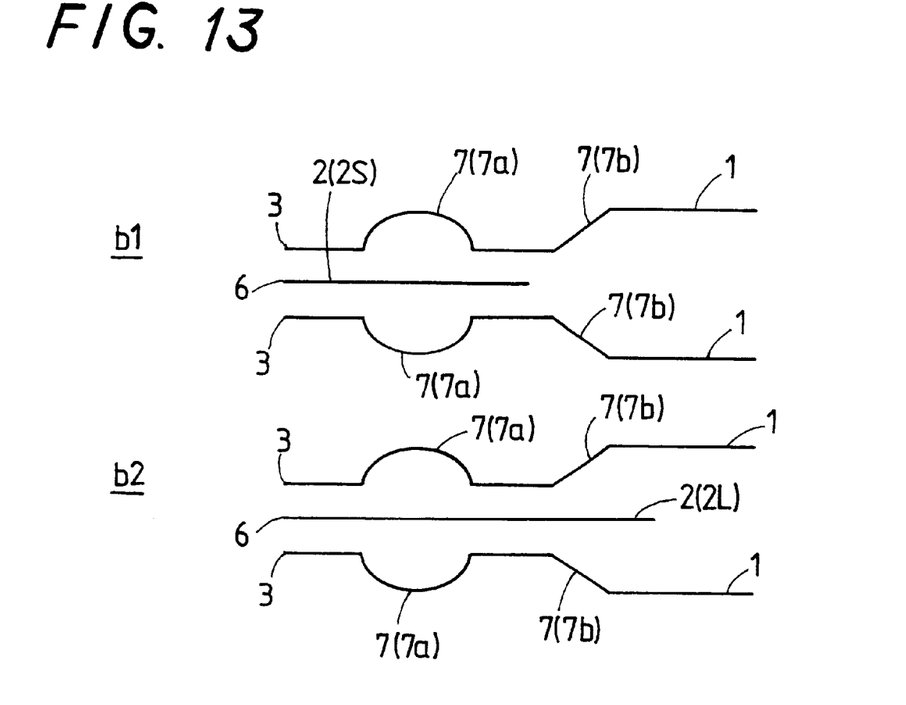
FIG. 13 is a schematic illustration showing further other modifications, in which the metal gasket of FIG. 1 is composed of two confronting bead plates and a sheet of shim disposed between them.
Figure 14:
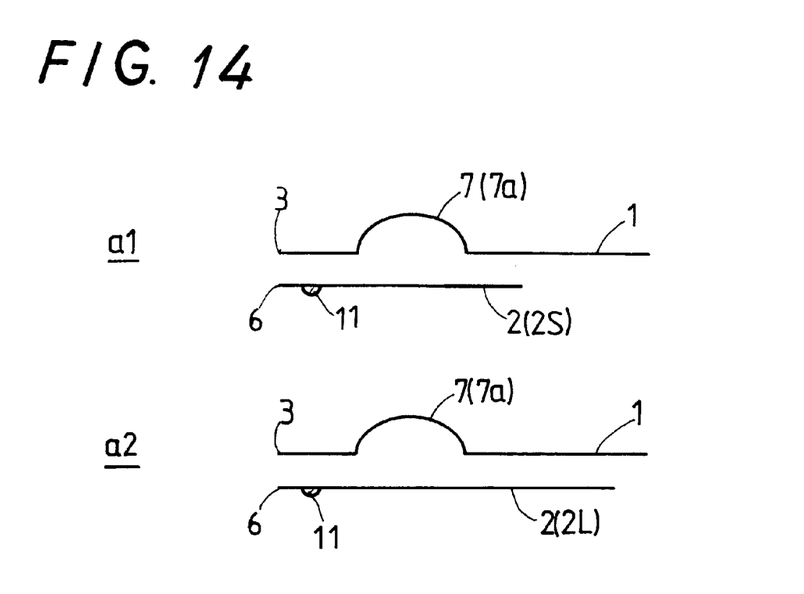
FIG. 14 is a schematic illustration showing further other modifications, in which the metal gasket of FIG. 1 is composed of a single bead plate and a sheet of shim.

Referring next to FIG. 13, there is shown another embodiment of the metal gasket according to the present invention. The metal gasket in FIG. 13 consists of two sheets of the bead plate 1, which are identical in configuration with each other, and a sheet of the shim 2 disposed between the bead plates 1 and varied in radial width circumferentially of the bore aperture 3. The shim 2 in b1 of FIG. 13 is shown taken along the area 2S narrow in radial width, where the shim 2 extends beyond the full bead 7a, and comes short of the half bead 7b. In contrast, the shim 2 in b2 of FIG. 13 is shown at the other area 2L wide or long in radial width, where the shim 2 extends over the half bead 7b. Each bead plate 1 in the metal gasket labeled b1 and b2 in FIG. 13 has two beads 7, both of which are raised above its one surface opposite to the other surface on which the shim 2 is overlaid. One bead 7 nearby the bore aperture 3 is formed in a full bead 7a while another bead 7 remote from the bore aperture 3 is formed in a half bead 7b.

Referring to FIG. 14, there is shown a further another embodiment of the metal gasket, which has a sheet of the bead plate 1 on which is provided a full bead 7a raided above its one surface opposite to the other surface on which the shim 2 is overlaid. Moreover, the shim 2 has an auxiliary bead 11 nearby the bore apertures 3 to help increase the sealing stress. The shim 2 in a1 of FIG. 14 is shown taken along the area 2S that is narrow or short in radial width, where the shim 2 extends over the full bead 7a on the bead plate 1, whereas the shim 2 in a2 of FIG. 14 is taken along other area 2L wide or long in radial width, where the shim 2 is largely beyond the full bead 7a.

Any metal gasket illustrated in FIG. 15 is composed of two sheets of the bead plate 1, two sheets of the shim 2 and an intermediate plate 10 that is also made with a bore aperture 12. The intermediate plate 10 is disposed between the bead plates 1 while the shims 2 are each interposed between the intermediate plate 10 and either one of the bead plates 1. In FIG. 15, the same metal gaskets are given any one of the same alphabetic characters a and b, and the metal gaskets suffixed with numeral 1 are shown at the area where the shims 2 are made narrow or short in radial width. In contrast, the metal gaskets suffixed with numeral 2 are illustrated at the area where the shims 2 are made wide or long in radial width. The shim 2 in a1 of FIG. 15 is shown taken along the area 2S that is narrow in radial width, where the shim 2 comes short of the full bead 7a, whereas the shim 2 in a2 of FIG. 15 is shown at the other area 2L long in radial width, where the shim 2 extends over the full bead 7a. On the other hand, the shim 2 in b1 of FIG. 15 is shown at the area 2S that is narrow in radial width, where the shim 2 covers entirely the width of the full bead 7a, whereas the shim 2 in b2 of FIG. 15 is shown at the other area 2L wide or long in radial width, where the shim 2 is largely beyond the full bead 7a.

Any metal gasket illustrated in FIG. 16, likewise with the metal gaskets in FIG. 15, is composed of two sheets of the bead plate 1, two sheets of the shim 2 and an intermediate plate 10 that is also made with a bore aperture 12. The intermediate plate 10 is disposed between the bead plates 1 while the shims 2 are each interposed between the intermediate plate 10 and either one of the bead plates 1. Also in FIG. 16, the same metal gaskets are given any one of the same alphabetic characters a and b, and the metal gaskets suffixed with numeral 1 are shown at the area where the shims 2 are made narrow or short in radial width. In contrast, the metal gaskets suffixed with numeral 2 are illustrated at the area where the shims 2 are made wide or long in radial width. Any bead plate 1 in a1 and a2 of FIG. 16 has a full bead 7c and a half bead 7b, both of which are raised above the side facing the shim 2. Any bead plate 1 in b1 and b2 of FIG. 16 is made with half beads 7b neighboring each other, which are raised above the side facing the shim 2. The shim 2 in a1 of FIG. 16 is shown taken along the area 2S that is narrow in radial width, where the shim 2 extends over the full bead 7c and reach nearby the half bead 7b. The shim 2 in b1 of FIG. 16 is also shown at the area 2S short in radial width, where the shim 2 covers only the width of the full bead 7a at most. On the other hand, the shim 2 in a2 of FIG. 16 is shown at the area 2L long in radial width, where the shim 2 extends over both the full beads 7c and the half beads 7b on the bead plates 1, while the shim 2 in b2 of FIG. 16 is shown at the other area 2L wide or long in radial width, where the shim 2 is largely beyond both the full beads 7a and the half beads 7b.

Any metal gasket shown in FIG. 17 is comprised of two sheets of the bead plate 1, a sheet of the shim 2 and an intermediate plate 10 that is large in thickness and also made with a bore aperture 12. In the bead plates 1 of the metal gasket labeled a1 and a2 in FIG. 17, any bead plate 1 on which the shim 2 is laid has a bead 7c raised above the surface facing the shim 2 while any bead plate 1 on which the intermediate plate 10 is laid is provided with two row of bead 7c raised above the surface facing the intermediate plate 10. Also in FIG. 17, the same metal gaskets are given any one of the same alphabetic characters a and b, and the metal gaskets suffixed with numeral 1 are shown at the area where the shim 2 is made narrow in radial width. In contrast, the metal gaskets suffixed with numeral 2 are illustrated at the area where the shim 2 is made wide in radial width. Any bead plate 1 in b1 and b2 of FIG. 17 has a bead 7a recessed below the surface facing either the intermediate plate 10 or the shim 2. Any shim 2 in a1 and b1 of FIG. 17 is shown taken along the area 2S that is narrow in radial width, where the shim 2 extends over the beads 7 at most. In contrast, any shim 2 in a2 and b2 of FIG. 17 is shown at the area 2L long in radial width, where the shim 2 extends far beyond the beads 7.

Any metal gasket shown in FIG. 18 is composed of three sheet of the bead plate 1 and a sheet of the shim 2 disposed between any two confronting bead plates 1. Also in FIG. 18, the same metal gaskets are given any one of the same alphabetic characters a and b, and the metal gaskets suffixed with numeral 1 are shown at the area where the shim 2 is made narrow in radial width. In contrast, the metal gaskets suffixed with numeral 2 are illustrated at the area where the shim 2 is made wide in radial width. In the metal gasket in a1 and a2 of FIG. 18, the two bead plates 1 arranged on the opposite sides of the shim 2, each to each side, have bead 7c raised above their surfaces facing the shim 2 while the remainder of the bead plates 1 has a bead 7a recessed below the surface facing directly either the former bead plate 1. In the metal gasket in b1 and b2 of FIG. 18, the two bead plates 1 disposed on the opposite sides of the shim 2, each to each side, have bead 7a recessed below their surfaces facing the shim 2 while the remainder of the bead plates 1 has a bead 7c raised above the surface facing directly either the former bead plate 1. Any shim 2 in a1 and b1 of FIG. 18 is shown taken along the area 2S that is narrow in radial width, where the shim 2 extends over the beads 7 at most. In contrast, any shim 2 in a2 and b2 of FIG. 18 is shown at the area 2L long in radial width, where the shim 2 extends far beyond the beads 7.

Figure 19:
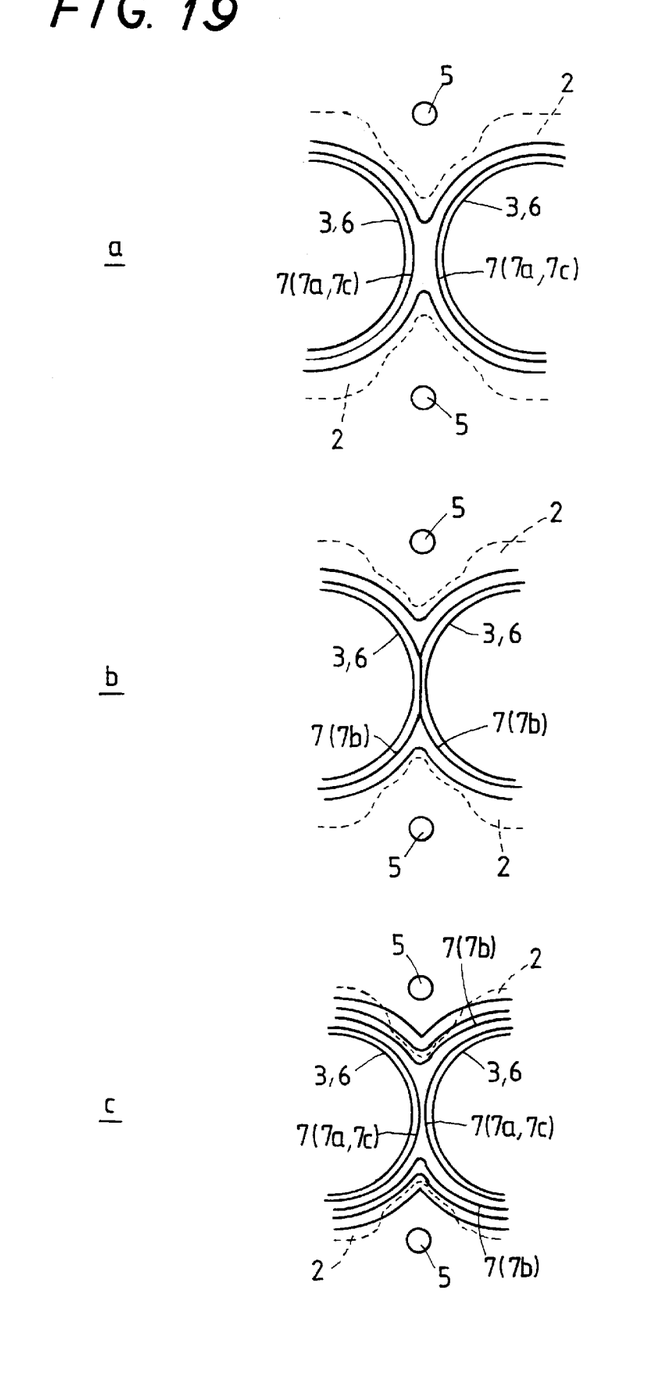
FIG. 19 is a fragmentary enlarged top plan view illustrating modifications of the relation among beads, shim and bolt holes in the area between the adjoining bore apertures of the metal gasket shown in FIG. 1.

Referring to FIG. 19, there are shown modifications at the area between the adjoining bore apertures 3, 6. The metal gasket in a of FIG. 19 has a bead plate 1 made with a single row of the full bead 7(7a, 7c). The modification in b of FIG. 19 has a bead plate 1 made with a single row of the half bead 7(7b). The metal gasket in c of FIG. 19 has a bead plate 1 on which are made a single row of the full bead 7(7a, 7c) and a single row of the half bead 7b that extends around the associated bore apertures 3 except for the area between the adjoining bore apertures 3.

While the present invention has been described in its preferred embodiments, it is to be distinctly understood that the invention is not limited thereto but may be otherwise variously embodied within the scope of the following claims.

What is claimed is:

1. In a metal gasket adapted to be used interposed between mating surfaces of a cylinder block and cylinder head held together with tightening bolts, which comprises a bead plate made with first bore apertures and beads extending around the first bore apertures, each to each aperture, and a shim made with second bore apertures in alignment with the first bore apertures and laid on the bead plate, the shim being composed of areas extending around the second bore apertures and bridges connecting the adjoining areas with each other;

the improvement wherein the shim around the second bore apertures has a radial width at the bridges between any adjoining second bore apertures, which is substantially equal with or less than a width across a web defined around any cylinder bore formed in mating surfaces of the cylinder block and cylinder head, and the shim at areas other than the bridges is varied continuously in its radial width in a range of from a flat area around the first bore apertures in the bead plate to an area corresponding the bead on the bead plate, whereby variations in radial width of the shim around the second bore apertures result in compensating partly for a sealing stress distribution around the first bore apertures, and wherein the shim, when relieved from tightening load, has a minimum width reaching an inside root of the bead nearest the first bore aperture, with beginning at a peripheral edge of the second bore aperture, while has a maximum width reaching any one of an area where the shim is beyond the inside root of the bead nearest the first bore aperture, but short of an outside root of the bead, with beginning at the peripheral edge of the second bore aperture, and another area where the shim is beyond the outside root of the bead, with beginning at the peripheral edge of the second bore aperture.

2. A metal gasket constructed as defined in claim 1, wherein the shim around the second bore apertures has a radial width that is made minimum at are as neighboring tightening holes formed in the bead plate for fitting the bolts.

3. In a metal gasket adapted to be used interposed between mating surfaces of a cylinder block and cylinder head held together with tightening torts, which comprises a bead plate made with first bore apertures and beads extending around the first bore apertures, each to each aperture, and a shim made with second bore apertures in alignment with the first bore apertures and laid on the bead plate, the shim being composed of areas extending around the second bore apertures and bridges connecting the adjoining areas with each other;

the improvement wherein the shim around the second bore apertures has a radial width at the bridges between any adjoining second bore apertures, which is substantially equal with or less than a width across a web defined around any cylinder bore formed in mating surfaces of the cylinder block and cylinder head, and the shim at areas other than the bridges is varied continuously in its radial width in a range of from a flat area around the first bore apertures in the bead plate to an area corresponding the bead on the bead plate, whereby variations in radial width of the shim around the second bore apertures result in compensating partly for a sealing stress distribution around the first bore apertures, and wherein the shim, when relieved from tightening load, has a minimum width extending beyond the outside root of the bead nearest the first bore aperture, with beginning at a peripheral edge of the second bore aperture, while has a maximum width reaching any one of an area where the shim is beyond the outside root of the bead nearest the first bore aperture, with beginning at the peripheral edge of the second bore aperture, and another area where the shim is far beyond the outside root of the bead, covering over partially or entirely another bead remote away from the first bore aperture, with beginning at the peripheral edge of the second bore aperture.

4. A metal gasket constructed as defined in claim 3, wherein the shim around the second bore apertures has a radial width that is made minimum at are as neighboring tightening holes formed in the bead plate for fitting the bolts.

* * * * *